United States Patent [19]

Blum

[11] Patent Number: 4,873,029

[45] Date of Patent: Oct. 10, 1989

[54] METHOD FOR MANUFACTURING LENSES

[76] Inventor: Ronald D. Blum, 2840 Hershberger Dr., Roanoke, Va. 24017

[21] Appl. No.: 114,962

[22] Filed: Oct. 30, 1987

[51] Int. Cl.⁴ ............................................. B29D 11/00
[52] U.S. Cl. ..................... 264/1.3; 264/1.7; 264/1.8; 264/2.7; 264/78; 351/162; 351/163
[58] Field of Search ............... 264/1.3, 1.7, 1.8, 1.9, 264/2.2, 2.7, 78; 351/162, 163

[56] References Cited

U.S. PATENT DOCUMENTS

| | | | |
|---|---|---|---|
| 2,397,231 | 3/1946 | Barnes | 264/1.3 |
| 3,674,587 | 7/1972 | Laliberte | 264/1.3 |
| 3,711,417 | 1/1973 | Schuler | 351/163 |
| 3,786,119 | 1/1974 | Ortlieb | 264/1.3 |
| 3,940,304 | 2/1976 | Schuler | 264/1.3 |
| 4,498,883 | 2/1985 | Bouchard et al. | 264/272.16 |

FOREIGN PATENT DOCUMENTS

| | | | |
|---|---|---|---|
| 882004 | 7/1953 | Fed. Rep. of Germany | 351/162 |
| 110431 | 7/1982 | Japan | 264/1.9 |
| 169820 | 9/1984 | Japan | 264/1.3 |
| 173910 | 8/1986 | Japan | 264/1.7 |
| 213114 | 9/1986 | Japan | 264/1.7 |
| 235113 | 10/1986 | Japan | 264/1.3 |
| 236521 | 10/1986 | Japan | 264/1.7 |
| 18225 | 1/1987 | Japan | 264/1.7 |
| 81/00769 | 3/1981 | PCT Int'l Appl. | 351/163 |
| 699736 | 11/1953 | United Kingdom | 264/1.7 |
| 1435329 | 5/1976 | United Kingdom | 264/1.3 |

Primary Examiner—James Lowe
Attorney, Agent, or Firm—Kenyon & Kenyon

[57] ABSTRACT

The disclosure relates to a method and apparatus for manufacturing lenses including the use of a wafer in conjunction with liquid monomer to provide a molded plastic lens. In the molding process, a first mold form is sealingly secured to a gasket to form a part of a mold for receiving liquid monomer. The liquid monomer is poured into the first mold form and the wafer material which can be tinted or have a different index of refraction is then placed in contiguous relationship with the liquid monomer. A second mold form is then secured into the gasket in sealing relationship therewith and spaced from the wafer to form a cavity therebetween. Liquid monomer is then introduced into the cavity to fill all the voids. The mold with the material to be molded is then placed in the oven and cured. After the curing process is completed, the mold is removed and the formed lens extracted. An alternative includes the use of a mold form which is of the same material as the monomer such that it ultimately forms part of the lens. In this instance, the mold form is consumed during the molding process as it becomes bonded by intermolecular action with the liquid monomer.

22 Claims, 1 Drawing Sheet

METHOD FOR MANUFACTURING LENSES

BACKGROUND OF THE INVENTION

In manufacturing lenses and particularly those lenses for use with eyeglasses, it has been desirable to have a number of characteristics, including tinting, multifocal lenses, hard coating, polaroid, photochromatic, safety, and ease of manufacture. Although there are processes presently existing for achieving each of these characteristics, they all have certain deficiencies which have hampered their broad use, particularly with plastic lenses.

For example, when attempting to tint plastic lenses by dipping them into a bath of dye, maintaining a consistent tint has been a difficult problem. Often the dye, because it will be absorbed entirely throughout the lens, will produce a gradient throughout the lens where some portions of the lens are darker than others. This is typically unacceptable to the consumer. If the dye is placed on the surface of the lens, on the other hand, it can easily be scratched or worn, creating an unsightly appearance for the eyeglasses. In multifocal lenses, there are often ledges and other protrusions which are unsightly and unappealing to the consumer. There have been attempts to blend these multifocal lenses to avoid the ledges and other lines defining the multifocal lenses, but these have been relatively expensive processes and some cases, prohibitive.

The invention described herein has overcome many of the deficiencies of the prior art noted above. For example, a tinting process has been developed which maintains consistency throughout a given cross-sectional area and avoids the gradients which have characterized other processes in tinting lenses. To accomplish this feature, a wafer of previously cured, solidified plastic material is tinted to the desired color. This wafer is then used in a mold with a monomer which will be polymerized to eventually form the lens with the tinted wafer formed integrately therewith.

More specifically, when a front mold form is utilized with a surrounding gasket, a portion of a liquid molding material is placed in this portion of the mold form. Subsequently, the tinted wafer is placed in contiguous relationship with the liquid molding material. A rear mold form is then fixed in the gasket spaced from the wafer to form a cavity therein for receiving plastic molding material. Liquid plastic molding material is then delivered into this cavity to completely fill all the voids in the mold.

The mold is then subjected to oven-curing process for solidifying the plastic molding material about the wafer and to cause intermolecular bonding between the molding material and the wafer. After the molding process has been completed, the mold is removed from the oven and the molded lens withdrawn from the mold in a form which is ready after some edge processing for use with eyeglasses. With this process, the tint is constrained generally in the vicinity of the wafer.

In another embodiment of the invention, the tinted wafer forms part of the first mold form of a mold which can be removed from the mold and ultimately form part of the lens as molded. In this instance, this mold form is tinted by dipping into the bath of dye similar to that discussed above. It is then fixed into a portion of the mold with a second mold form being spaced therefrom to form a cavity between the two mold forms. The plastic molding material is then delivered into the mold cavity until it completely fills all the voids therein without any intervening wafer. The mold is then subjected to oven-curing process to solidify the plastic molding material and again to cause the molecular bonding between the molding material and first mold form. After curing, the mold is withdrawn and the lens formed separated from the mold with the first mold form being bonded to the polymerized plastic material. In other words, a portion of the mold is consumed in the molding process and forms part of the formed lens. Prior to this step the front portion of the wafer, which will ultimately be a portion of the lens, can be hard-coated to protect the tint in the remaining portion of the lens. In the embodiment discussed below when the mold form becomes part of the article, it is also referred to as a "preform".

Multifocal lenses can be produced using a similar process to that discussed above. The wafer can be initially formed with a ledge which is part of a segment having a different power than the remaining portion of the wafer. This wafer, when used as an intermediate step in the molding process as discussed above, will have a different material with a different index of refraction than the liquid plastic that will ultimately form part of the lens when cured.

The wafer with the bifocal or multifocal segments will be inserted into the molding process after an initial amount of liquid molding material has been placed into the mold as discussed above. The remaining steps are similar to those of the tinting process.

Where the wafer actually forms the first mold form, the bifocal, or multifocal segment is preferably on the rear surface of the first mold to create a more pleasing and unobtrusive appearance to the consumer. In this case, the wafer will be preformed with the segment having the desired bifocal power. The wafer would then be included with the mold and filled and cured as described above.

Another feature of the invention is to place the segment forming the additional bifocal power on the exterior surface of the lens is ultimately molded. With this feature, a segment mold is secured to the surface of the plastic lens to form with a cavity which corresponds to configuration of the bifocal or multifocal power segment. After having been clamped into position, the mold is filled with liquid molding material and cured as described above. With this feature, the bifocal segment can be placed at any position desired by the doctor to insure that it is in the correct position with regard to the user and not limited to fixed positions of any preforms.

The above has been a brief discussion of certain features of the invention. Other features and advantages of the invention will be appreciated from the detailed discussion of the preferred embodiment below.

DETAILED DISCUSSION OF THE PREFERRED EMBODIMENT

Figure 1:
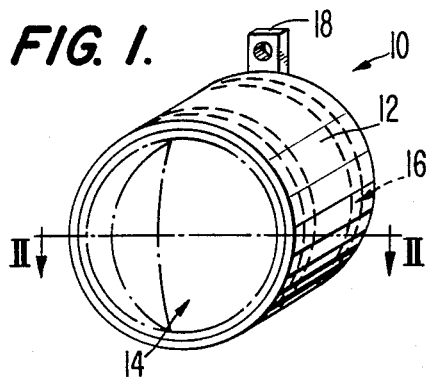
FIG. 1 is a perspective view of a mold of the invention.

The mold for producing tinted lens and lens with other configurations is shown in FIG. 1. Mold 10 includes a flexible gasket 12 in the form of a band which completely circumscribes other elements of the mold. The mold includes a front form 14 and a rear form 16 releasably secured in sealing relationship with respect to the gasket. These first and second mold forms 14 and 16 are spaced from one another to form cavity 28 therebetween. Each mold form 14 and 16 has a special configuration to produce at a lens having the desired power as required by the patient and prescribed by practicing opticians, optometrists, and ophthalmologist. Typically, there may be a large number of these mold forms which can be removed from the mold and replaced by forms which will have the desired configurations for a particular prescription.

Figure 2:
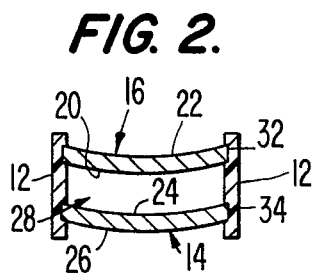
FIG. 2 is a cross-section of the embodiment shown in FIG. 1 taken along lines 2—2.
Figure 3:
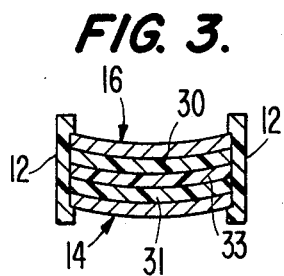
FIG. 3 is the cross-section shown in FIG. 2 including material to be molded.

As can be seen more clearly in FIG. 3, the first form 14 includes a convex surface 26 exterior exposed to the exterior of the mold and a concave surface 24 facing the interior of the mold cavity 28. The second mold form, or rear mold 16, includes an interior convex surface 20 and an exterior concave surface 22. For the purposes of defining the form of the lens, the interior surfaces 24 and 20 will impart to the lens the desired form to achieve the prescribed correction. The exterior surfaces 22 and 26 could optionally be of any configuration. The lens edges are designed to frictionally fit in annular grooves 32 and 34 to releasably secure them in place and seal them from the atmosphere. Once in place, a portion of the gasket can be peeled away to permit access for delivering monomer or liquid plastic material into the mold cavity 28 for forming the lens. As shown in FIG. 2, the front and rear mold forms are made of glass. However, they could be made of metal so long as they have the desired configuration and interact with the gasket as described above.

Utilizing this mold, a process for achieving tinting of the lens can be achieved eliminating gradients and other problems discussed above. The tinting is achieved by utilizing a pretinted plastic wafer inserted into the mold between liquid monomer molding material as can be seen in FIG. 3. The process steps include initially placing the first or front mold form 14 into the gasket 12 as shown. The liquid monomer, or at least a portion of the liquid monomer is placed into the mold form 14 and the wafer 33 is then placed in contiguous relationship with the liquid monomer before the mold is closed. The mold is then closed by placing rear or second mold form 16 into sealing relationship with the gasket, as shown in FIG. 3. This will leave a cavity 28 in the mold between the second mold form 16 and the wafer 33. Cavity 28 is then filled with liquid monomer to completely fill all the voids within the cavity.

Figure 4:
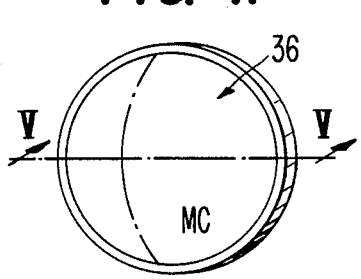
FIG. 4 is a perspective view of the lens formed using the apparatus of FIG. 1.
Figure 5:
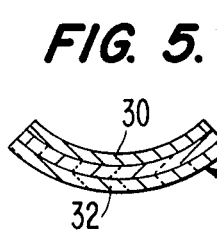
FIG. 5 is a cross-section of the lens as shown in FIG. 4 taken along lines 5—5.

The mold with the liquid monomer 31 and 30 and the wafer 33 therebetween is then subjected to oven-curing for polymerizing the liquid monomer. During this curing, the liquid monomer solidifies and causes an intermolecular bonding with the wafer material 33. In this specific embodiment, the wafer material is formed from the same monomer as the liquid monomer used in the molding process. Once the curing step has been completed, the mold is removed from the oven and the mold forms peeled away from the gasket permitting the lens 36 to be removed. Lens 36 as shown in FIG. 4 and in a cross-section in FIG. 5. There it can be seen that the tinted wafer remains tinted at a relatively constant cross-section in the vicinity of the wafer as originally placed during the molding process bounded on either side by the polymerized plastic material 30 and 31.

Although in the drawing, definite lines of demarcation between the wafer 33 and the plastic material bounding it on either side 30 and 32, such definite line of demarcation does not exist. Rather, because of intermolecular bonding, this line would be somewhat blurred. This process insures that the tinted material remains in a constant area within the lens and avoids the gradients discussed above. As a result, a multitude of different colors can be used which heretofore has been an unavailable tinting processes for plastic lenses.

The type of plastic material used in the preferred embodiment is CR-39 which is a registered trademark of PPG Industries and a form of allyl diglycol carbonate. The wafer is initially formed in prior molding process from the monomer and polymerized to form a solid plastic material in a disc-like configuration. This wafer is then tinted to the desired color by subjecting it to a bath of dye until the desired tint is achieved. The hard or cured wafer is then used in the liquid monomer as discussed above to achieve the desired tint. After this process, of course, the lens can be subjected to other processes such as hard coating or other finishes as may be desired without adversely affecting the tint. Because the tint is completely interior to the portion of the lens, it is generally not subject to any surface abrasions.

In addition to carrying tint, the wafer can also act as a carrier for other materials. Often, for cosmetic reasons, it is desirable to have jewelry or inscription embodied in the wafer and ultimately on the glasses. This is achieved simply by using adhesive and to adhere the jewelry or other material for example that which can be used to form the initials of the patient in securing this matter to the carrier. The carrier can then be placed into the mold as described above, and once the molding process is completed, the jewelry or other cosmetic material will be retained within the plastic mold and not subjected to scratching or other abrasives which could otherwise cause these cosmetic items to be damaged or even removed from the lens.

Figure 6:
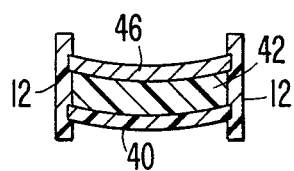
FIG. 6 is a cross-section of a mold utilizing another process of the invention.

In another embodiment of the invention, the first form as can be seen in FIG. 6, form 40, is made of plastic material and actually forms part of the ultimately formed lens. In this process it is essential that the form 40 have an exterior surface 41 which is configured to cooperate with other portions of the lens and achieve the desired power and correction. The second form 46 acts in the same manner as form 16 described above in defining an interior convex surface corresponding to the concave surface of the lens being formed.

Where tinting is desired, form 40 is subjected to the tinting process as discussed above with respect to the wafer 33. Because form 40 will have a consistent cross-sectional area throughout, it still would not be subjected to the gradient problems which would otherwise occur in tinting the ultimately formed lens. However, to insure that any abrasion or scratching of the exterior surface adversely affects the tint, it can be hard-coated prior to subjecting it to a molding process.

Figure 7:
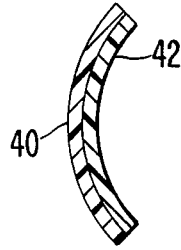
FIG. 7 is a cross-section of the lens formed by the apparatus shown in FIG. 6.

In any event, once the form 40 has been tinted, it is fixed to gasket 12 as shown. The rear or second mold form 46 is also secured to the gasket spaced from the first form 40 to form a cavity therebetween in sealed relationship with gasket 12. Once the forms are in place, the liquid monomer is delivered to the cavity in the same manner discussed above with respect to FIG. 1. Again, the mold is subjected to oven curing until the monomer is polymerized and sufficiently hardened to act as a lens for glasses. Once the curing process is completed, the mold is removed and the lens extracted from the mold. However, in this instance, the mold form will ultimately form part of the lens and therefore the form 40 can be referred to as "consumed" during the molding process. As can be seen in FIG. 7, mold form 40 is bonded to the portion 42 formed during the molding process. Again, as with FIG. 5, although clear line of delineation are shown between these items 40 and 42, the line in actuality is blurred because of the intermolecular action.

In another embodiment of the invention, the wafer 33 shown in FIG. 3, could be in the form of a bifocal or other multifocal lens. In this instance, the bifocal segment of the wafer would be formed prior to its use in the mold with the bifocal or multifocal segments having the desired power or correction. Because the plastic material during the molding process will completely engulf the segment and can possibly detract from the corrective features, the wafer is formed from material having a different index of refraction than that of the molding material. This insures that the bifocal or multifocal features are not changed during the molding process. The process of placing the wafer into the mold is accomplished in the same manner as described in conjunction with FIG. 3 and is not required to be reiterated here.

As with the tinted process, the wafer with the bifocal or multifocal features can also form the exterior portion of the form as described above with respect to FIGS. 6 and 7. In this embodiment, again, the wafer would be preformed having the desired multifocal segments formed thereon. The wafer can then be fixed in place as shown in FIG. 6 and formed by delivering the liquid monomer to the cavity, subjecting it to curing until sufficiently hardened, and remove it from the cavity as discussed above. In this case, since form 40 employs a bifocal segment on its exterior surface, it can be of the same material as the liquid monomer.

It should be understood that, although the above invention has been discussed largely with configuration of the first or front mold form, particularly with respect to consumable molds, the rear mold can have the desired configuration and other features. This may be more advantageous particularly with bifocal lens since the bifocal or multifocal segments would be in the rear portion of the lens and not extending from the front surface which might create an unacceptable appearance to the consumer.

Figure 8:
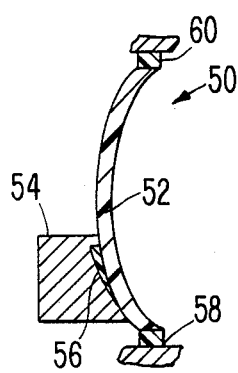
FIG. 8 is a cross-section of another embodiment of the invention showing a segment mold.
Figure 9:
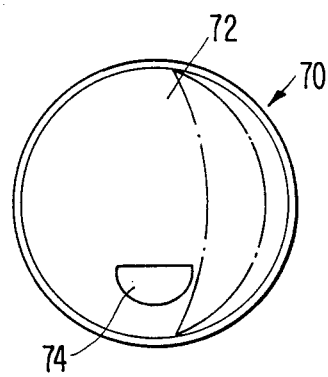
FIG. 9 is a perspective view of the lens with a bifocal segment formed by the process as shown in FIG. 8.

Another feature of the invention is to insure that the multifocal segments are placed in the correct position with regard to the wearer. In certain performance lenses, the bifocal or multifocal segments may not be in a position which is comfortable to the patient. To avoid this problem, where the lens is formed by one of the processes noted above, the bifocal segment can be added in a subsequent molding process. As can be seen in FIG. 8, a segment mold 54 is fixed to the desired position on the front of the lens 52. This mold will form a cavity 56 sealed from the surrounding environment between the mold and the lens. This cavity 56 configuration corresponds to the desired correction or power for the lens. The liquid monomer is delivered to the cavity until it completely fills all the voids therein and the lens is then treated in the same manner as discussed above with regard to oven curing to insure that its polymerization occurs and sufficiently hardening occurs. The lens 70 includes the bifocal segment 74 as shown fixed to the surface of the lens by intermolecular bonding during the curing process using the mold descried above in conjunction with FIG. 8.

In addition to tinting or bifocal features, the wafer can include polarizing features such that the desired polarity is achieved and is completely sealed from the surrounding environment by the molded plastic. Photochromatic material can be used in conjunction with the wafer and molded according to the processes discussed above. To achieve the desired photochromatic features, typically the photochromatic material would operate in conjunction with other tinted material on the surface of the lens. It has often been difficult to achieve photochromatic features in a fully plasticized lens. When the photochromatic material is used in conjunction with other tinted material as discussed above, it will cooperate with the tint to achieve the desired overall color and shading when subjected to light.

In another embodiment of the invention one portion of the lens being molded can be of a softer material than another. For example, where a first mold form is part of a consummable mold, it can be cured such that it will not harden to the degree of other portions of material and prism the lens. Where the consummable mold form is hard-coated, then subjected to the molding process discussed above, the plastic material of the mold form will be softer and relatively resilient. This enables the lens to better avoid shattering and accept shock. The same effect is accomplished where the wafer that is used as an intermediate in the molding process is of a softer material than the surrounding plastic.

The above has been a detailed discussion of the preferred embodiment. It should not be considered undue limiting of applicant's invention which is more fully defined in the claims which follow.

What is claimed:

1. A method for tinting plastic lens comprising:
   (a) arrange a first mold form for receiving molding material;
   (b) delivering plastic molding material to said first mold form;
   (c) inserting a tinted wafer of solidified plastic material capable of intermolecular bonding with said plastic molding material into said first mold form in contiguous relationship with said plastic molding material;
   (d) fixing a second mold form in sealed relationship with said first mold form to form a mold having a cavity between said wafer and said second mold form;
   (e) inserting additional plastic molding material into said mold cavity;
   (f) said mold forms configured to form a lens of preselected shape;
   (g) subjecting said mold to oven curing process to solidify the plastic molding material and to cause intermolecular bonding between the molding material and the wafer; and (h) removing said molded material from said mold with said wafer in the form of a lens.

2. The method according to claim 1 wherein said mold includes a flexible gasket with means for releasably securing said first mold in sealable relationship therewith and means for releasably securing said second mold form in sealable relationship therewith spaced from said first mold form.

3. The method according to claim 2 wherein said first mold form has a generally circular periphery and an internal concave configuration, and said second mold form has a generally circular periphery with an internal surface which is generally convex in configuration; and said wafer being generally circular having an effective diameter substantially identical to that of said mold forms.

4. The method according to claim 3 wherein said plastic molding material is a liquid monomer and said step of inserting additional molding material includes injecting through the interface between at least one of said mold forms and said flexible gasket said liquid monomer.

5. The method according to claim 4 wherein said wafer has attached jewelry thereto prior to insertion of said tinted wafer.

6. The method according to claim 4 wherein said wafer of plastic material and said monomer are formed from the same material of allyl diglycol carbonate.

7. The method according to claim 6 wherein the molde are configured to produce plastic lens conforming to prescription eyeglasses.

8. The method according to claim 4 wherein said wafer has attached indicia thereto prior to insertion of said tinted wafer.

9. A method for manufacturing tinted plastic lenses comprising:

(a) tinting a plastic preform by dipping the preform into a bath of dye having the desired color;

(b) said tinted preform configured to be a first preform of a mold for lenses;

(c) fixing a second mold form with respect to said first preform in sealed relationship therewith to form a cavity therebetween;

(d) introducing into said cavity plastic molding material capable of intermolecular bonding with said first plastic preform;

(e) subjecting said mold to an oven curing process to solidify the moldable plastic material and to cause intermolecular bonding between the plastic material and said first preform; and (f) removing from the mold the preform bonded to the molding material.

10. The method according to claim 9 wherein said first preform is hard-coated on one exterior surface prior to said preform being fixed relative to said second mold form.

11. The method for forming a lens according to claim 10 wherein said hard-coat application step occurs independently of any tinting step.

12. The method according to claim 10 wherein said mold includes a flexible gasket, said first preform has an interior surface which is concave in configuration, and said second mold form includes an interior surface which is convex in configuration, said first preform and said second mold form being configured to form a lens of a preselected prescription for use with eyeglasses; said gasket including means for retaining said first preform and said second mold form in sealed spaced relationship to form the mold cavity therebetween.

13. The method according to claim 12 wherein at least one of said first preform and said molding material is formed from a plastic material that is softer than the other.

14. The method according to claim 12 wherein prior to fixing said second mold form, liquid molding material is placed into said mold, photochromatic wafer is placed in contiguous relationship with said liquid plastic molding material, said second form is then fixed with respect to said first preform in sealed relationship to form a cavity between the wafer and said first preform.

15. The method according to claim 12 wherein prior to fixing said second mold form, liquid molding material is placed into said mold, a wafer of polarized material is placed in contiguous relationship with said liquid plastic molding material, said second preform is then fixed with respect to said first form in sealed relationship to form a cavity between the wafer and said first preform.

16. A method for manufacturing multifocal lens comprising:

(a) arranging a first mold form for receiving the plastic molding material;

(b) delivering plastic molding material to said first mold form;

(c) inserting a wafer having a different index of refraction into said first mold portion in contiguous relationship with said plastic molding material;

(d) closing said mold with a second mold form to form a cavity between said second mold form and said wafer;

(e) inserting additional plastic molding material into said cavity;

(f) subjecting said mold to oven curing process solidifying said plastic molding material and to cause intermolecular bonding between the molding material and said wafer; and (g) removing said molding material from said mold.

17. The method according to claim 16 wherein said wafer includes a portion of which has a configuration different from the remainder of said wafer to obtain a different power corresponding to that of at least of a bifocal lens.

18. A method for making multifocal lens comprising:

(a) forming a first plastic preform having at least a portion with a power different than the remainder of the plastic preform and configured to be part of the lens for use in eyeglasses;

(b) fixing a second mold form in sealed relationship with said first preform to form a cavity therebetween;

(c) introducing into said cavity plastic molding material;

(d) subjecting said mold to an oven curing process to solidify the plastic molding material and to cause intermolecular bonding between the molding material and said first preform.

19. The method according to claim 18 wherein said first preform is hard-coated prior to being fixed relative to said second form.

20. The method according to claim 18 wherein said first preform is tinted prior to being fixed relative to said second form by dipping said form into a bath of dye.

21. The method according to claim 18, 19, or 20 wherein said first preform is made of the same material as said plastic molding material.

22. The method according to claim 20 wherein said material is a monomer of allyl diglycol carbonate.

* * * * *